United States Patent
Kim et al.

(10) Patent No.: US 9,036,604 B2
(45) Date of Patent: May 19, 2015

(54) HANDOVER IN WHITE SPACE BAND

(75) Inventors: Eunsun Kim, Gyeonggi-do (KR);
Yongho Seok, Gyeonggi-do (KR);
Byoung Hoon Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 13/816,541

(22) PCT Filed: Aug. 12, 2011

(86) PCT No.: PCT/KR2011/005951
§ 371 (c)(1),
(2), (4) Date: Feb. 28, 2013

(87) PCT Pub. No.: WO2012/021027
PCT Pub. Date: Feb. 16, 2012

(65) Prior Publication Data
US 2013/0156007 A1    Jun. 20, 2013

Related U.S. Application Data

(60) Provisional application No. 61/373,239, filed on Aug. 12, 2010.

(51) Int. Cl.
*H04W 4/00* (2009.01)
*H04W 36/08* (2009.01)
*H04W 8/26* (2009.01)
*H04W 84/12* (2009.01)

(52) U.S. Cl.
CPC ............... *H04W 36/08* (2013.01); *H04W 8/26* (2013.01); *H04W 84/12* (2013.01)

(58) Field of Classification Search
USPC .................................. 370/331, 338
See application file for complete search history.

(56) References Cited

U.S. PATENT DOCUMENTS

| 2010/0246506 A1* | 9/2010 | Krishnaswamy | 370/329 |
| 2011/0317632 A1* | 12/2011 | Bahl et al. | 370/329 |
| 2012/0192935 A1* | 8/2012 | Zuniga et al. | 136/255 |
| 2012/0294168 A1* | 11/2012 | Freda et al. | 370/252 |

(Continued)

OTHER PUBLICATIONS

Written Opinion and International Search Report issued in corresponding International Patent Application No. PCT/KR2011/005951 dated Mar. 29, 2012.
Emmelmann et al., "Influence of network load on the performance of opportunistic scanning," IEEE 34th Conference in Local Computer Networks, pp. 601-608, Oct. 20-23 2009.

(Continued)

*Primary Examiner* — Andrew Lee
(74) *Attorney, Agent, or Firm* — Morgan, Lewis & Bockius LLP (57) ABSTRACT

Provided are a method and a device for performing a handover in a wireless LAN system operating in a white space band. A method includes: allowing a specific station (STA) to access a service region of a second access point (AP), the specific STA associated with a first AP and storing a first enablement STA identification information ("IDINFO"), the first enablement STA IDINFO being an IDINFO of an enablement STA managing STA enablement from the first AP; receiving a message, from the second AP, including a second enablement STA IDINFO (an IDINFO of an enablement STA managing STA enablement provided by the second AP); comparing the first and second enablement STA IDINFO; if the first and second enablement STA IDINFO are different, performing a procedure for changing an enablement STA and a handover to the second AP, to a second enablement STA, which corresponds to the second enablement STA IDINFO.

14 Claims, 8 Drawing Sheets

(56) References Cited

U.S. PATENT DOCUMENTS

| | | | |
|---|---|---|---|
| 2013/0010687 A1* | 1/2013 | Gaal et al. | 370/328 |
| 2013/0201884 A1* | 8/2013 | Freda et al. | 370/278 |
| 2013/0311669 A1* | 11/2013 | Reimers et al. | 709/231 |
| 2013/0329693 A1* | 12/2013 | Lee et al. | 370/329 |
| 2013/0331117 A1* | 12/2013 | Probasco et al. | 455/456.1 |
| 2014/0023031 A1* | 1/2014 | Irnich et al. | 370/329 |

OTHER PUBLICATIONS

Katsaros et al., "Design challenges of open spectrum access," PIMRC 2008. IEEE 19th International Symposium on Personal, Indoor and Mobile Radio Communication, pp. 1-5, Sep. 15-18, 2008.

Arkoulis et al. "Distributed sensing for spectrum agility: Incentives and security considerations", in Proceedings of Euro-NF, 2008.

Search Report issued in corresponding International Patent Application No. PCT/KR2011/005951 dated Mar. 29, 2012.

* cited by examiner

| element ID | length | DSE registered location element body field |
|---|---|---|
| 1 | 1 | 20 |

Octets:

FIG. 6

| B0 | | B5 | B6 | | B30 |
|---|---|---|---|---|---|
| | latitude resolution | | | latitude decimal | |

Bits      6                       25

| B31 | | B39 | B40 | | B45 |
|---|---|---|---|---|---|
| | latitude integer | | | longitude resolution | |

Bits      9                       6

| B46 | | B70 | B71 | | B79 |
|---|---|---|---|---|---|
| | longitude decimal | | | longitude integer | |

Bits      25                       9

| B80 | B83 | B84 | B89 | B90 | B97 |
|---|---|---|---|---|---|
| altitude type | | altitude resolution | | altitude decimal | |

Bits      4          6          8

| B98 | | B119 | B120 | | B122 |
|---|---|---|---|---|---|
| | altitude integer | | | datum | |

Bits      22                       3

| B123 | B124 | B125 | B126 | | B127 |
|---|---|---|---|---|---|
| registration location agreement | registration location DSE | dependent STA | | reserved | |

Bits      1      1      1      2

| B128 | B143 |
|---|---|
| dependent enablement ID | |

Bits      16

| B144 | | B151 | B152 | | B159 |
|---|---|---|---|---|---|
| | normal class | | | channel number | |

Bits      8                       8

FIG. 7

| Category | Operation | Requester STA address | Responder STA address | Cause result code | Enablement ID |
|---|---|---|---|---|---|

Octets:　　　1　　　　2　　　　　6　　　　　　　6　　　　　　　1　　　　　2

FIG. 8

| Element ID | Length | Advertisement protocol tuple #1 | Advertisement protocol tuple #2 (option) | Advertisement protocol tuple #n (option) |
|---|---|---|---|---|

Octets:　　　1　　　　1　　　Variable　　　　Variable　　　　Variable

HANDOVER IN WHITE SPACE BAND

This is a U.S. National Phase Entry of PCT Application No. PCT/KR2011/005951, filed Aug. 12, 2011, and claims the benefit of U.S. Provisional Application No. 61/373,239 filed Aug. 12, 2010.

FIELD OF THE INVENTION

The present invention relates to a method and apparatus for performing handover in a wireless local area network (WLAN) system operating in a white space band.

BACKGROUND ART

Wireless Local Area Network (WLAN) technology has been developed as the Institute of Electrical and Electronics Engineers (IEEE) 802.11 standard. IEEE 802.11a and 802.11b use an unlicensed band at 2.5 GHz or 5 GHz. IEEE 802.11b provides a transfer rate of 11 Mbps and IEEE 802.11a provides a transfer rate of 54 Mbps. IEEE 802.11g applies Orthogonal Frequency Division Multiplexing (OFDM) at 2.4 GHz to provide a transfer rate of 54 Mbps. IEEE 802.11n applies Multiple Input Multiple Output (MIMO)-OFDM to provide a transfer rate of 300 Mbps for four spatial streams. IEEE 802.11n supports a channel bandwidth up to 40 MHz and, in this case, provides a transfer rate of 600 Mbps.

Currently, IEEE 802.11af that specifies operation of an unlicensed device in a TV White Space (TVWS) band is being developed.

A TVWS includes Very High Frequency (VHF) bands (54 to 60, 76 to 88, and 174 to 216 MHz) and Ultra High Frequency (UHF) bands (470 to 698 MHz) allocated for TV broadcast and refers to frequency bands in which use of unlicensed devices is permitted under the condition that it does not hinder communication of licensed devices (a TV and a wireless microphone) operating at the corresponding frequency bands.

All unlicensed devices are permitted to operate in frequency bands of 512 to 608 MHz and 614 to 698 MHz except in a few special cases. However, frequency bands of 54 to 60 MHz, 76 to 88 MHz, 174 to 216 MHz, and 470 to 512 MHz are used only for communication between fixed devices. The fixed devices refer to devices which perform transmission only in a determined location. In the following description, a white space band includes the above-described TVWS but is not limited thereto.

An unlicensed device which desires to use the white space band should provide a protection function for a licensed device. Accordingly, the unlicensed device must confirm whether the licensed device occupies the corresponding band before starting signal transmission in the white space band.

To this end, the unlicensed device must obtain information about an available channel list (i.e. a set of available channels) in a corresponding area by accessing a Geo-location Database (GDB) through the Internet or a dedicated network. The Geo-location Database (GDB) is a database for storing and managing information about licensed devices registered therewith and information about channel use which dynamically varies according to geographic location and channel use time of the licensed device.

A station (STA) can perform a spectrum sensing mechanism. An energy detection scheme, a feature detection scheme, etc. can be used as the spectrum sensing mechanism. For example, it is possible to determine that a channel is being used by a licensed device or an incumbent user when the intensity of a received signal exceeds a predetermined value or a DTV preamble is detected. When it is determined that a channel immediately adjacent to a currently used channel is used by an incumbent user, an STA and an AP need to decrease transmit (Tx) power.

Meanwhile, the STA operating in the white space band may also have mobility. If a specific STA moves from a region of one AP to a region of another AP, association between the specific STA and a legacy AP is severed and association between the specific STA and a new AP is then created in such a manner that the specific STA can be handed over from the legacy CP to the new AP.

DETAILED DESCRIPTION OF THE INVENTION

Technical Problem

However, a handover in the white space band needs to consider not only AP handover but also the change or non-change of an enabling STA configured to take charge of STA enablement.

An object of the present invention is to provide a method and apparatus for efficiently performing a handover in a white space hand in consideration of the above-mentioned handover features.

Technical Solution

The object of the present invention can be achieved by providing a method for performing handover by a station (STA) in a white space band wireless communication system, the method comprising: allowing a specific STA to access a service region of a second access point (AP), wherein the specific STA is associated with (or connected to) a first access point (AP) and stores identification information (hereinafter referred to as first enablement STA identification information) of an enablement STA managing STA enablement provided by the first AP; receiving a message including identification information of the enablement STA (hereinafter referred to as second enablement STA identification information) provided by the second AP, from the second AP; comparing the first enablement STA identification information with the second enablement STA identification information; if the first enablement STA identification information is different from the second enablement STA identification information, performing not only a procedure for changing an enablement STA to an enablement STA (hereinafter referred to as second enablement STA) corresponding to the second enablement STA identification information, but also a handover to the second AP.

The method may further include, if the first enablement STA identification information is identical to the second enablement STA identification information, performing a handover to the second AP without performing the enablement STA change procedure.

The enablement STA change procedure may include: transmitting an enablement request message to the second enablement STA; and receiving an enablement response message to the enablement request message from the second enablement STA.

The received message may be a beacon, and source identification information of the beacon may be compared with the second enablement STA identification information so as to determine whether the second AP is the second enablement STA.

If source identification information of the beacon may be identical to the second enablement STA identification information, the second AP is the second enablement STA.

If source identification information of the beacon may be different from the second enablement STA identification information, the second AP may be a dependent AP of the second enablement STA.

The first enablement STA identification information and the second enablement STA identification information may be MAC addresses of the enablement STA.

In another aspect of the present invention, a station (STA) device for performing handover in a white space band wireless communication system includes: a memory for storing identification information of an enablement STA managing STA enablement provided by a first access point (AP) (hereinafter referred to as a first AP) associated with the STA device; a transceiver, if the STA device accesses a service region of a second access point (AP), for receiving a message including identification information of the enablement STA (hereinafter referred to as second enablement STA identification information) provided by the second AP, from the second AP; and a processor connected to the memory and the transceiver, for comparing the first enablement STA identification information with the second enablement STA identification information when receiving the message, if the first enablement STA identification information is different from the second enablement STA identification information, and performing not only a procedure for changing an enablement STA to an enablement STA (hereinafter referred to as second enablement STA) corresponding to the second enablement STA identification information, but also a handover to the second AP.

If the first enablement STA identification information is identical to the second enablement STA identification information, the processor performs a handover to the second AP without performing the enablement STA change procedure.

The enablement STA change procedure may include: transmitting an enablement request message to the second enablement STA; and receiving an enablement response message to the enablement request message from the second enablement STA.

The received message may be a beacon, and source identification information of the beacon may be compared with the second enablement STA identification information so as to determine whether the second AP is the second enablement STA.

If source identification information of the beacon is identical to the second enablement STA identification information, the second AP is the second enablement STA. If source identification information of the beacon is different from the second enablement STA identification information, the second AP may be a dependent AP of the second enablement STA.

The first enablement STA identification information and the second enablement STA identification information are MAC addresses of the enablement STA.

Effects of the Invention

As is apparent from the above description, the embodiments of the present invention can perform not only AP handover but also efficient handover considering the change or non-change of an enabling STA configured to take charge of STA enablement in a white space band.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and denoted in the form of a block diagram on the basis of important functions of the present invention. Wherever possible, the same reference numbers will be used throughout the drawings to refer to the same or like parts.

For detailed description of handover of the STA for performing WLAN operations in the white space band, characteristics of the WLAN system and operation characteristics of the white space band will hereinafter be described with reference to the attached drawings.

Figure 1:
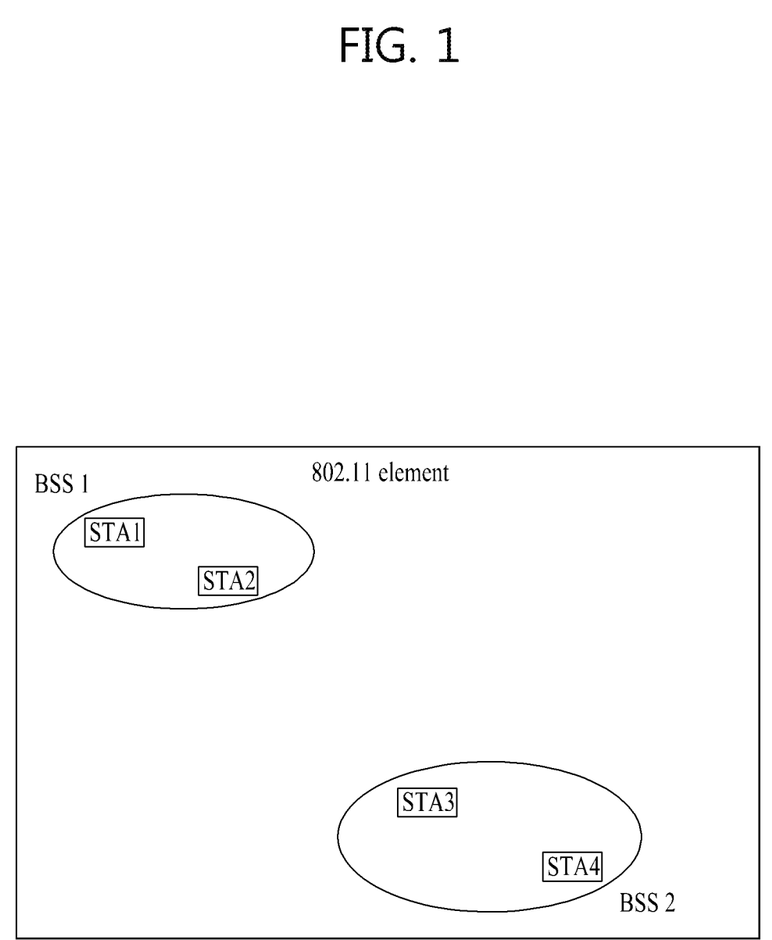
FIG. 1 is a conceptual diagram illustrating one example of a basic configuration of a WLAN system.

FIG. 1 illustrates an exemplary configuration of a wireless LAN system.

As shown in FIG. 1, the wireless LAN system includes one or more Basic Service Sets (BSSs). A BSS is a set of Stations (STAs) which can communicate with each other after successfully achieving synchronization.

The STA is a logical entity that includes an interface for a physical layer of a wireless medium and a Medium Access Control (MAC) layer. STAs include access point (AP) and non-AP stations. Among STAs, a mobile terminal that is operated by a user may be a non-AP STA. When the term "STA" is stated, it may refer to a non-AP STA. The non-AP STA may also be referred to as a terminal, a Wireless Transmit/Receive Unit (WTRU), a User Equipment (UE), a Mobile Station (MS), a mobile terminal, or a mobile subscriber unit. The AP is an entity that provides an associated station (STA), which is coupled to the AP, with a connection to a Distribution System (DS) through a wireless medium.

The BSS may be classified into an infrastructure BSS and an independent BSS (IBSS).

Each BSS shown in FIG. 1 is an IBSS. The IBSS is a BSS that does not include an AP. Since the IBSS does not include an AP, the IBSS is not allowed to connect to a DS and thus forms a self-contained network.

Figure 2:
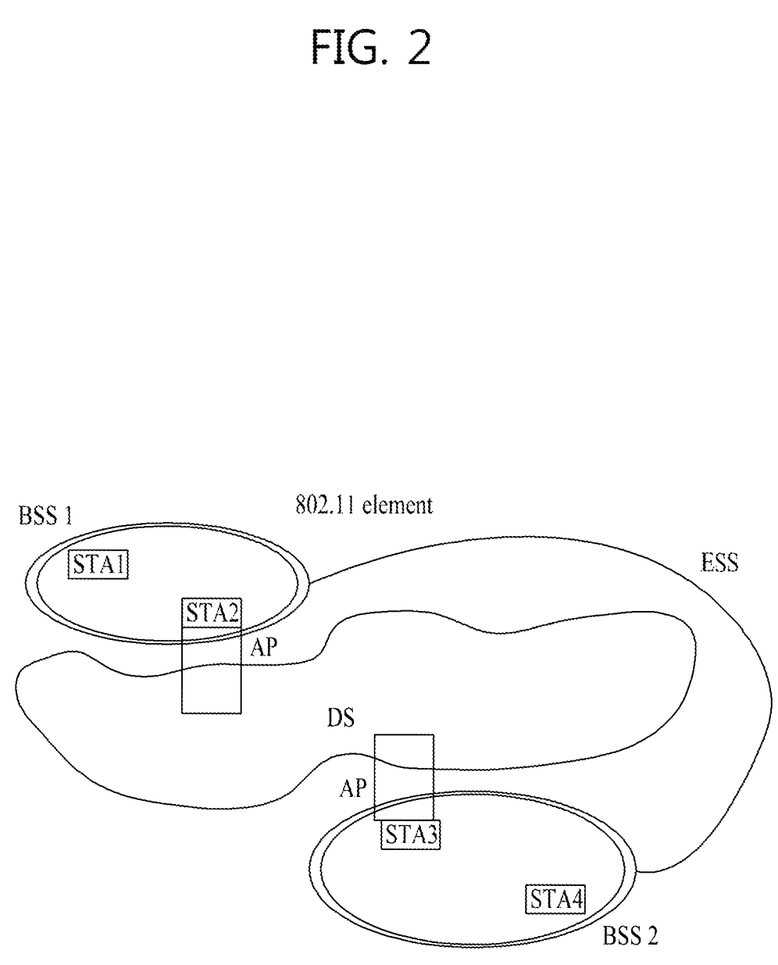
FIG. 2 is a conceptual diagram illustrating another example of a basic configuration of a WLAN system.

FIG. 2 illustrates another exemplary configuration of the wireless LAN system.

Each BSS shown in FIG. 2 is an infrastructure BSS. The infrastructure BSS includes one or more STAs and an AP. In the infrastructure BSS, in principle, communication between non-AP STAs is performed via an AP. However, when a direct link has been established between non-AP STAs, direct communication can be performed between the non-AP STAs.

As shown in FIG. 2, a plurality of infrastructure BSSs can be connected to each other through a DS. A plurality of BSSs connected through a DS is referred to as an Extended Service Set (ESS). STAs included in the ESS can communicate with each other. In the same ESS, a non-AP STA can move from one BSS to another BSS while performing seamless communication.

The DS is a service which connects a plurality of APs. The DS is not necessarily a network and there is no limitation to the form of the DS provided that the DS can provide a specific distribution service. For example, the DS may be a wireless network such as a mesh network and may also be a physical structure that connects APs to each other.

An STA enablement process for enabling the STA to operate in a white space band (for example, a TV white space (TVWS) band) and a process for obtaining an available channel list will hereinafter be described in detail.

An unlicensed device which operates in a whitespace band may be classified into an enabling STA and a dependent STA. The enabling STA is an STA which can enable the dependent STA. Even when the enabling STA has not received an enabling signal, the enabling STA can transmit a signal and can initiate the network.

The enabling STA may provide geo-graphic information to a database (DB) and acquire information regarding channels available at a corresponding geo-location from the DB. The enabling STA is not necessarily a WLAN STA and may be a logical entity or a network server that can provide enabling-related services.

The dependent STA is an STA which can transmit a signal only when the dependent STA has received an enabling signal. The dependent STA is controlled by the enabling STA. The dependent STA should be enabled through the enabling STA and cannot be enabled independently.

Figure 3:
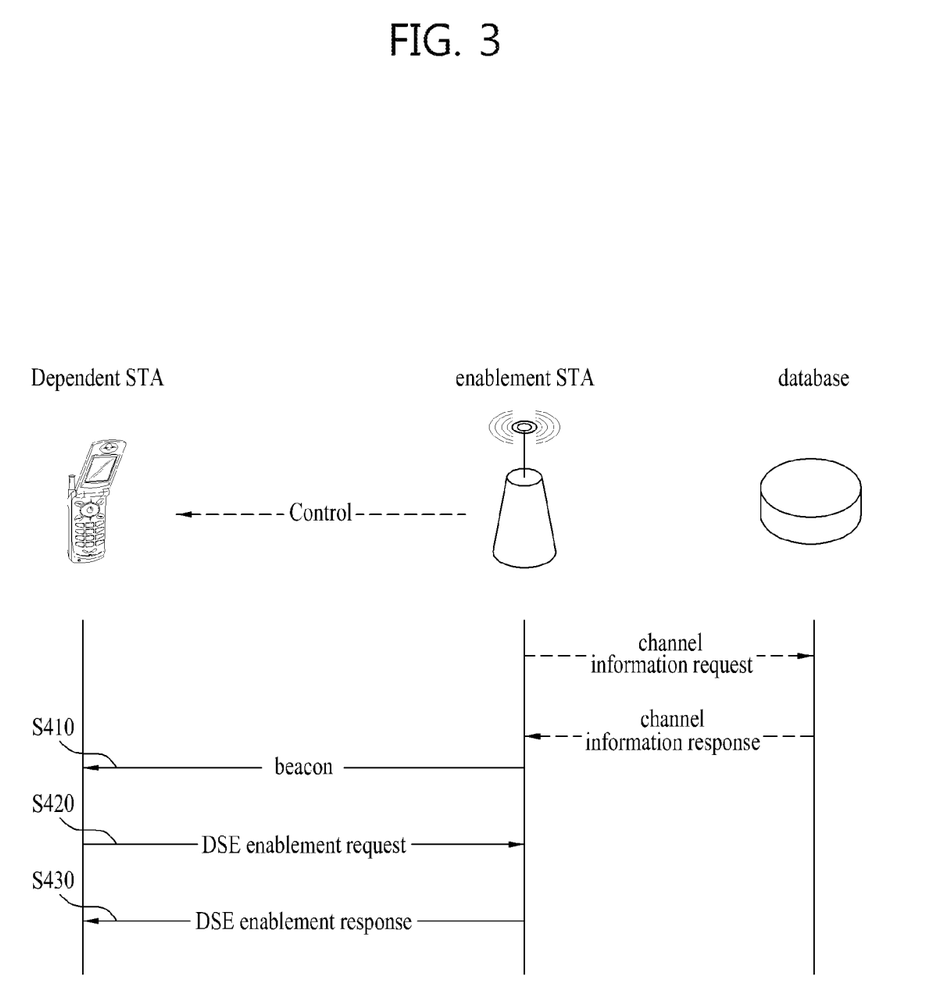
FIG. 3 is a conceptual diagram illustrating an STA enablement process.

FIG. 3 illustrates an exemplary STA enablement procedure.

The procedure in which a dependent STA is enabled by an enabling STA may be performed in a manner similar to the DSE procedure of IEEE 802.11y.

Referring to FIG. 3, the enablement STA may transmit a beacon including an enabling signal in step S410. For example, the enabling signal may be a beacon or probe response message including a RegLoc DSE bit in which a DSE Registered Location element is set to 1. In another example, the enabling signal may also be a beacon or probe response message including an advertisement protocol tuple in which an advertisement protocol ID value is set to a Registered Location Query Protocol (RLQP). Various kinds of enabling signals will hereinafter be described in detail, but the scope or spirit of the present invention is not limited thereto. The enablement STA may include a DSE Registered Location element in a probe response frame instead of a beacon. In this way, a signal capable of indicating enablement of a specific STA may be referred to as an enabling signal. In the above-mentioned example, a beacon or probe response frame including a DSE registered location element may be used as an enabling signal.

The dependent STA having received/decoded the enabling signal transmits a DSE enablement request frame to the enablement STA in step S420, and can receive a DSE enablement response frame from the enablement STA in step S430. In this case, the DSE enablement response frame may include channel information available in the white space band. The dependent STA having received the DSE enablement response message is enabled such that the WLAN operation can be performed using the received available channel information. In the above-mentioned example, transmission of a DSE enablement request message may use a channel indicated by the DSE registered location element. The DSE enablement request message may include a device ID of an STA requesting enablement. The enablement STA may determine enablement of the corresponding dependent STA through verification of the device ID.

In the meantime, irrespective of whether or not enablement is performed through a certain procedure, each dependent STA enabled after completion of enablement can maintain its own enablement state only under the condition that it has periodically received the enabling signal from the enablement STA having enabled the dependent STA, and signals can be transmitted in the corresponding band (for example, TV white space). In addition, the enabled dependent STA can receive a query about an operation channel state from the enablement STA. That is, the enablement STA transmits a query about an operation channel state to the enabled dependent STAs through ID information of STAs enabled by the enablement STA, and receives an operation channel state response message in response to the query such that it can manage states of the operation channels.

Meanwhile, the AP configured to provide a service to a specific STA need not always be an enablement STA for managing enablement of the dependent STA as described above. In other words, the AP may be a dependent STA enabled by receiving an enabling signal from the enablement STA so as to perform necessary operations in the white space band, and the AP may also be referred to as a dependent AP.

Figure 4:
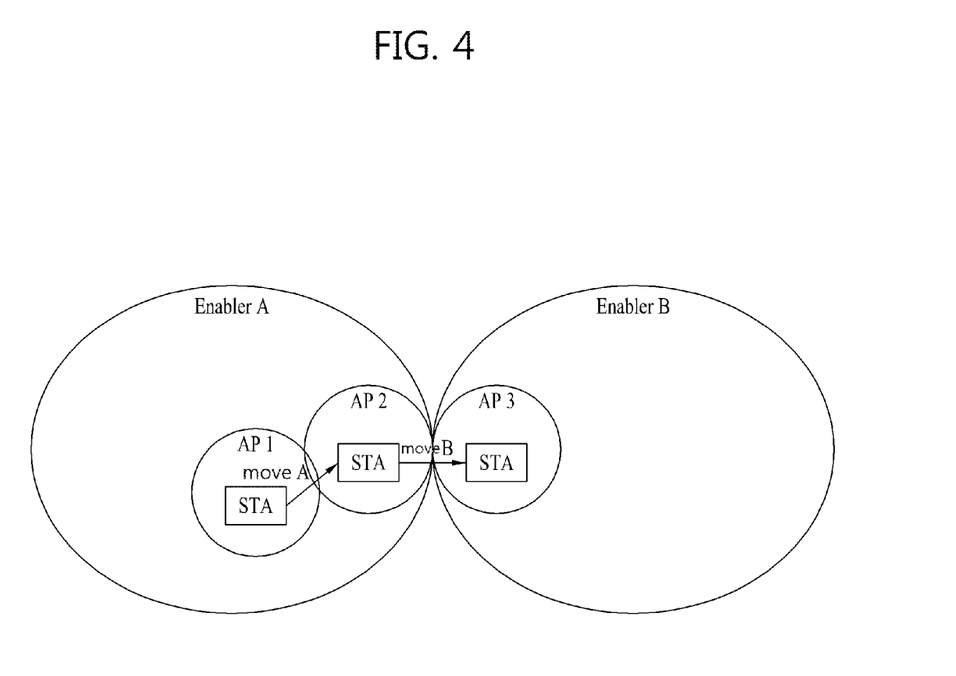
FIG. 4 is a conceptual diagram illustrating handover in a white space band according to one embodiment of the present invention.

FIG. 4 is a conceptual diagram illustrating handover in a white space band according to one embodiment of the present invention.

In FIG. 4, it is assumed that APs (AP1, AP2, AP3) providing services to the STA are dependent APs. That is, the corresponding APs may be STAs enabled through the enablement STAs (i.e., enabler A, enabler B). The dependent STAs provided by the dependent AP receive the operation channel inquiry of the enablement STA from the dependent AP, and transmit a response to the received operation channel inquiry to the enablement STA through the dependent AP.

Referring to FIG. 4, if the STA provided by the access point 1 (AP1) approaches a service region of an AP2 as denoted by Movement A, STA has only to perform the AP handover process for changing an associated AP from AP1 to AP2. That is, AP1 and AP2 are managed by the same STA (Enabler A) such that there is no change in the enablement STA.

However, assuming that STA moves from the service region of the AP2 to the service region of the AP3, the STA according to one embodiment of the present invention performs a procedure for changing not only the AP handover procedure but also the enablement STA. General handover in the wireless communication system has prescribed only a base station (BS) change procedure from a serving BS from a target BS. The STA configured to perform the WLAN operation in the white space band provides not only the AP handover for changing a connected AP but also the procedure for changing the enablement STA. If the STA moves to the region managed by different enablement STAs, the STA must periodically receive the enabling signal from the enablement STA having enabled the STA in a subsequent WLAN operation, and can cope with enablement STA management such as operation channel state inquiry, etc.

The procedure for changing the enablement STA may include receiving an enabling signal of the new enablement STA, transmitting an enablement request message on the basis of the received enablement signal, and receiving an enablement response message to the enablement request message. For convenience of description, the above-mentioned enablement STA changing procedure may also be referred to as enablement STA handover. The examples shown in FIG. 4 can be classified as shown in Table 1.

TABLE 1

|  | AP Handover | Enablement STA handover |
|---|---|---|
| Movement A | O | X |
| Movement B | O | O |

Based on the above-mentioned description, a method for performing a handover of an enablement STA, and a method for discriminating an exemplary case in which an enablement STA handover procedure must be executed will hereinafter be described.

Figure 5:
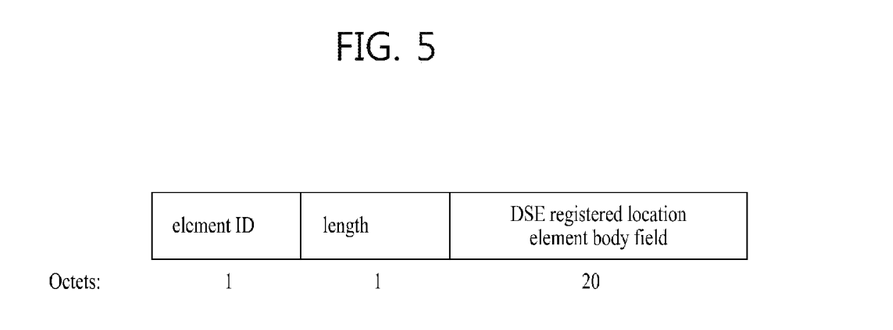
FIG. 5 shows an example of a DSE registered location element capable of being contained in a beacon or probe response message periodically transmitted from an AP.

FIG. 5 shows an example of a DSE registered location element capable of being contained in a beacon or probe response message periodically transmitted from an AP.

Referring to FIG. 5, the DSE registered Location Element includes an element ID field indicating that the corresponding element is a DSE registered location element, a length field indicating an element length, and a body field of the DSE registered Location Element. The DSE registered Location Element includes DSE location configuration information (LCI) that includes latitude, longitude, and altitude. The body field of the DSE registered location element is shown in FIG. 6.

Figure 6:
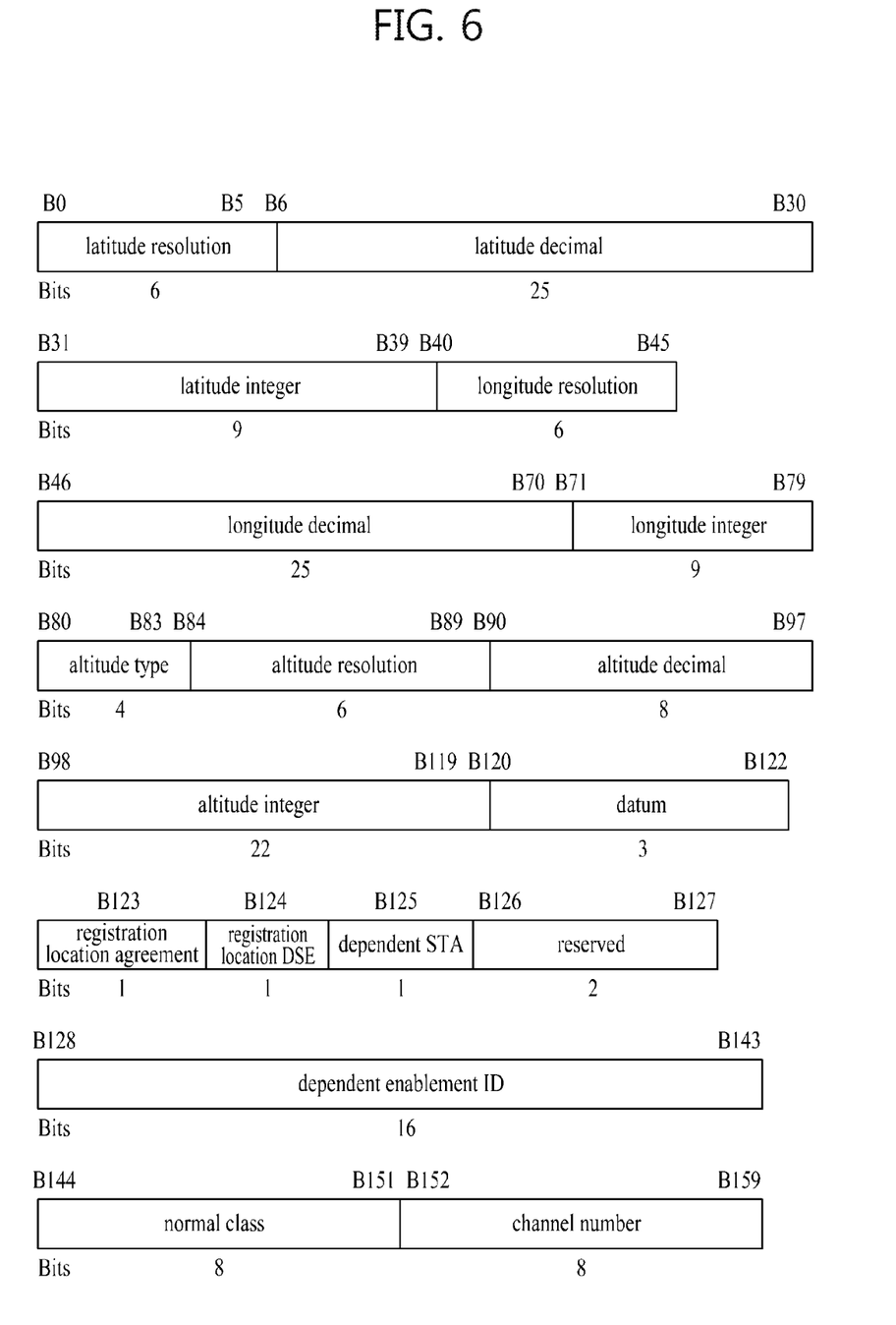
FIG. 6 shows a body field of a DSE registered Location Element.

FIG. 6 shows a body field of a DSE registered Location Element.

Referring to FIG. 6, the body field of the DSE registered Location Element may include latitude, longitude, and altitude information as DSE LCI.

A 'RegLoc Agreement' field is set to 1, if the STA transmitting this element operates in a national policy area or an international agreement area located in the vicinity of a border. Otherwise, the 'RegLoc Agreement' field is set to 0.

The 'RegLoc DSE' field indicates whether the enablement STA enables operations of STAs through a DSE. If the 'RegLoc DSE' field is set to 1, the corresponding signal may be considered to be an enablement signal.

If the STA configured to transmit the dependent STA field is operated by enablement of the enablement STA having an LCI corresponding to this element, the dependent STA field may be set to 1. Otherwise, the dependent STA field may be set to 0.

A 'Dependent Enablement Identifier' field is 16 bits long, wherein an enablement STA has a specific value established through a DSE enablement frame. In the remaining cases, the 'Dependent Enablement Identifier' field may be set to 0.

In addition, the 'Operating Class' field is a field capable of indicating a channel set to which enablement request, report or notification can be applied. The channel number field is a field capable of indicating a channel in which the enablement request, report or notification can be achieved.

Figure 7:
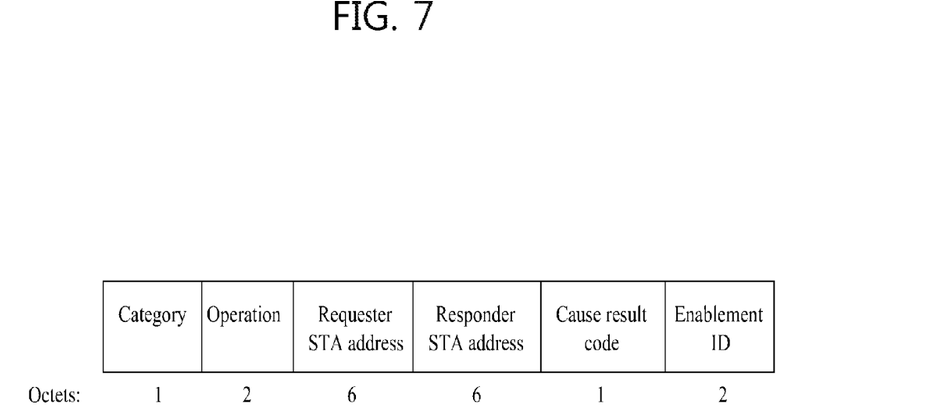
FIG. 7 shows an example of a DSE enablement frame format.

FIG. 7 shows an example of a DSE enablement frame format.

In the DSE enablement frame shown in FIG. 7, a requester STA address field indicates a MAC address of the STA having requested initiation of the main enablement process, and a responder STA address field indicates a MAC address of the STA having approved enablement (i.e., a MAC address of the enablement STA).

The AP may transmit the beacon or probe response message including the above-mentioned elements to STAs. Referring to FIG. 4, the STA handed over from the service region of the AP1 to the service region of the AP2 can determine whether the AP2 corresponds to an enablement STA or a dependent AP through a beacon/probe response message transmitted from the AP2, and can obtain information about the enablement STA configured to manage the AP2. In more detail, the STA can recognize whether the AP2 is an enablement STA through the dependent STA field of the DSE registered Location Element transmitted from the AP2.

If the AP2 is a dependent AP, the STA may obtain information about an enablement STA (i.e., Enabler A of FIG. 4) through a responder STA address field of a beacon/probe response message including a DSE enablement element received from the AP2. One embodiment of the present invention provides a method for allowing the beacon/probe response message transmitted from the AP to include ID information of the enablement STA of the corresponding AP.

Likewise, the STA handed over from the service region of the AP2 to the service region of the AP3 can determine whether the AP3 is an enablement STA through a beacon/probe response message. If the AP3 is a dependent AP, the STA can obtain information about the enablement STA configured to manage the AP3. As a result, the STA can determine whether the AP handover and the STA handover are simultaneously performed.

The above-mentioned exemplary method for determining whether AP handover and enablement STA handover are simultaneously performed through the beacon/probe response message is disclosed only for illustrative purposes and better understanding of the present invention, and is not intended to describe a unique embodiment through which the present invention can be carried out. That is, the STA that has received a message including ID information of an enablement STA (or STA itself) managing the corresponding AP from the AP can determine whether the AP handover and the enablement STA handover are simultaneously performed.

Meanwhile, the message received from the AP may be an enabling signal. For example, if the AP configured to transmit the message including the DSE registered Location Element is an enablement STA, the 'RegLoc DSE' field is set to 1 and the 'RegLoc DSE' field of 1 is transmitted such that STAs can recognize enablement information. Upon receiving the 'RegLoc DSE' field of 1, the STA considers the corresponding AP to be an enablement STA, considers a message of the corresponding AP to be an enabling signal, and transmits an enablement request signal to the corresponding AP, such that the AP handover and the enablement STA handover can be simultaneously carried out.

Meanwhile, a Registered Location Query Protocol (RLQP) scheme may be used as another enablement scheme. That is, DSE enablement can be carried out using Generic Advertisement Service protocol of 11u.

The STA supporting the GAS protocol includes the interworking element in each of a beacon frame and a probe response frame and transmits the resultant beacon frame or probe response frame. The advertisement protocol ID supported by the STA may be transmitted through the advertisement protocol element.

Figure 8:
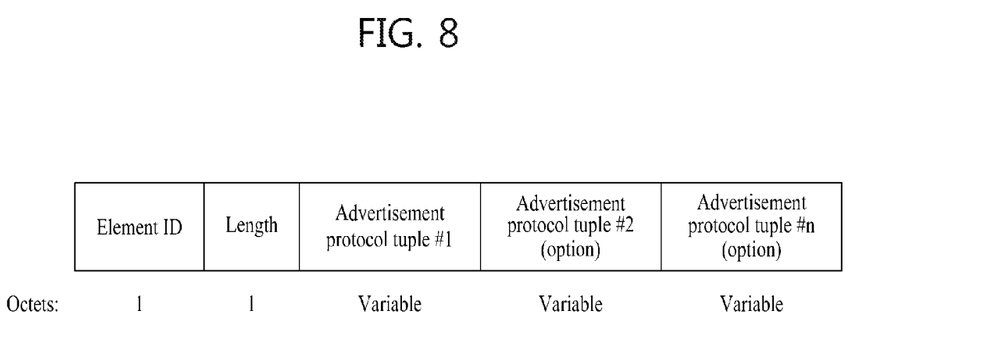
FIG. 8 shows an example of an advertisement protocol information element format.

FIG. 8 shows an example of an advertisement protocol information element format.

Referring to FIG. 8, the advertisement protocol information element may be transmitted through the beacon and the probe response frame. The advertisement protocol information element may be composed of a plurality of advertisement protocol tuples, each of which can be recognized through FIG. 9.

Figure 9:
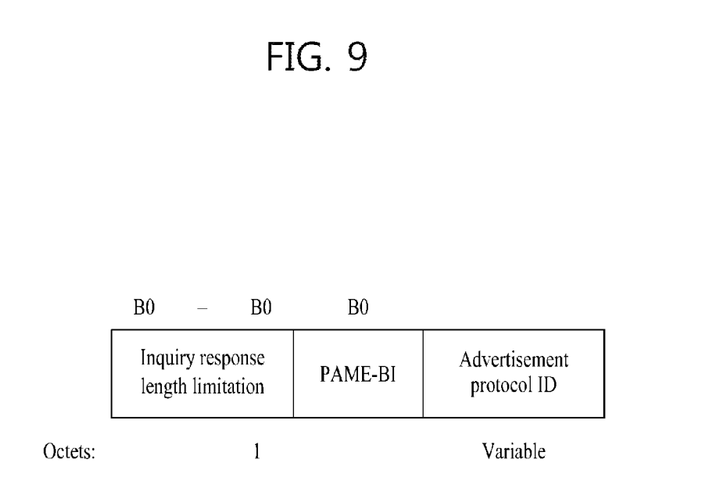
FIG. 9 shows an example of an advertisement protocol tuple structure.

FIG. 9 shows an example of an advertisement protocol tuple structure.

A Query Response Length Limit in the Advertisement Protocol Tuple may indicate a maximum length of the query response. The Advertisement Protocol ID indicates an advertisement protocol supported by the STA. Table 2 shows ID values capable of being allocated to the advertisement protocol according to one embodiment of the present invention.

TABLE 2

| Name | Value |
| --- | --- |
| Access Network Query Protocol | 0 |
| MIH Information Service | 1 |
| MIH Command and Event Services Capability Discovery | 2 |
| Emergency Alert System (EAS) | 3 |
| Registered Location Query Protocol | 4 |
| Reserved | 5-220 |
| Vendor Specific | 221 |
| Reserved | 222-255 |

That is, if the advertisement protocol ID is set to 4 according to one embodiment, this means that RLQP is supported by AP.

It is assumed that, if an advertisement protocol element including an advertisement protocol tuple having a protocol ID indicating RLQP from among advertisement protocol IDs is present in the beacon or probe response frame of the white space band, the corresponding beacon/probe response frame is used as an enabling signal. That is, the enabling signal is a signal indicating that enablement is possible. STAs having received the corresponding enabling signal can transmit the DSE enablement element using the GAS protocol. The following Table 3 shows an example of the RLQP information ID definition list.

TABLE 3

| Information name | Information ID | RLQP information element (paragraph) |
| --- | --- | --- |
| Reserved | 0 | N/A |
| DSE enablement | 1 | 7.3.5.1 |
| Reserved | 2-220 | N/A |
| Vendor Specific | 221 | 7.3.5.1 |
| Reserved | 222-255 | N/A |

"Paragraph" in Table 3 means a paragraph of IEEE 802.11 standard documents.

Figure 10:
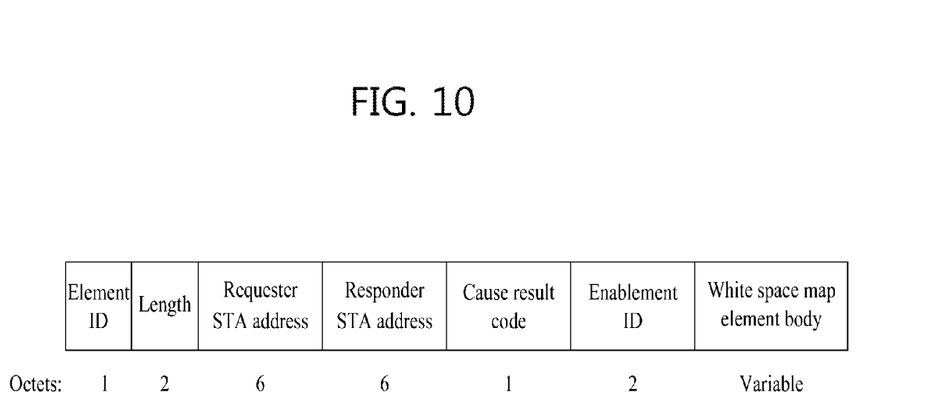
FIG. 10 shows an example of a Registered Location Query Protocol (RLQP) DSE enablement element format according to one embodiment of the present invention.

FIG. 10 shows an example of a Registered Location Query Protocol (RLQP) DSE enablement element format according to one embodiment of the present invention.

In the RLQP DSE enablement element shown in FIG. 10, the requester STA address and the responder STA address are identical to those of FIG. 7. That is, the requester STA address field indicates a MAC address of the STA requesting initiation of the main enablement process, and the responder address field indicates a MAC address of the STA permitting enablement (i.e., a MAC address of the enablement STA).

The STA that has received the beacon/probe response message including the RLQP DSE enablement element from the AP may determine whether the corresponding AP is an enablement STA; and/or if the corresponding AP is a dependent AP, the STA may obtain ID information of the enablement STA having enabled the corresponding AP. In more detail, the STA obtains the enablement STA address information through the responder STA address of the received RLQP DSE enablement element, and compares the enablement STA address information with the AP address information, such that it can determine whether the corresponding AP is an enablement STA according to the result of comparison.

In addition, the above-mentioned beacon/probe response message based on the GAS protocol can also be used as the enabling signal without departing from the spirit or scope of the inventions.

Figure 11:
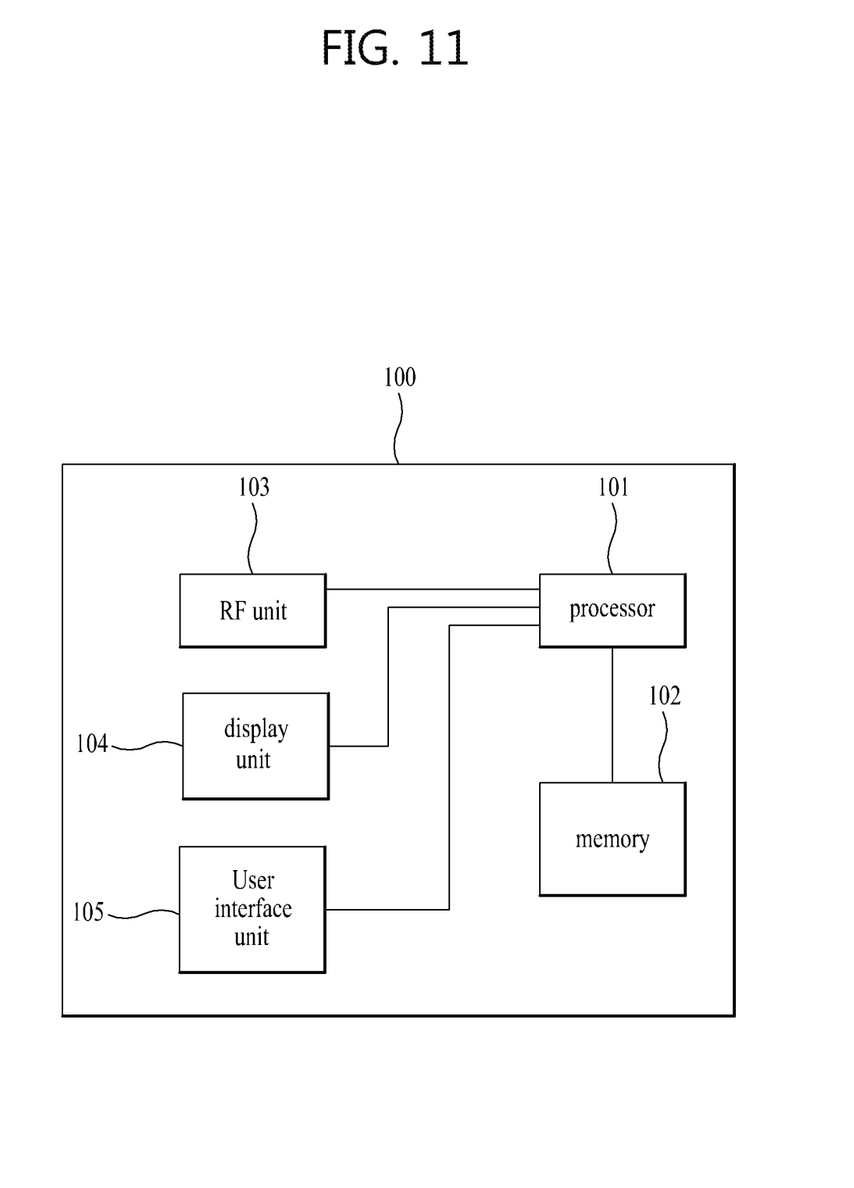
FIG. 11 is a block diagram illustrating a station (STA) applicable to the present invention.

FIG. 11 is a block diagram illustrating a station (STA) applicable to the present invention.

Referring to FIG. 11, an STA device 100 may include a processor 101, a memory 102, an RF (Radio Frequency) unit 103, a display unit 104, and a user interface (UI) unit 105. Functions of layers including a physical interface protocol layer can be executed by the processor 101.

The memory 102 is electrically connected to the processor 101 and stores an operating system, applications and general files.

If the STA device 100 is a user device, the display unit 104 can be implemented using a known Liquid Crystal Display (LCD), Organic Light Emitting Diode (OLED), etc. and display various information. The user interface unit 105 can be configured in such a manner that it is combined with a known user interface such as keypad, touch-screen, etc.

The RF unit 103 is electrically/functionally connected to the processor 101 and transmits/receives RF signals. The RF unit 103 can include a transmission module and a reception module. The RF unit 103 may be referred to as a transceiver.

The transmission module can code and modulate signals and/or data that are scheduled by the processor 101 to be transmitted, and then deliver the signals and/or data to an antenna.

The reception module can decode and demodulate an RF signal received through the antenna to restore the RF signal to original data and transmit the original data to the processor 101.

The memory 102 of the STA 100 stores ID information (i.e., first enablement STA ID information) managing STA enablement provided by the AP (first AP) connected to the STA 100. In addition, if the STA 100 approaches the service region of the second AP, the RF unit or the transceiver 103 can receive a message including ID information (i.e., second enablement STA ID information) of the enablement STA managing STA enablement provided by the second AP from the second AP. In this case, although the reception message may be the beacon/probe response message as an example, the scope or spirit of the present invention is not limited thereto.

In addition, the processor 101 compares first enablement STA ID information with second enablement STA ID information upon receiving a message. If the first enablement STA ID information is different from the second enablement STA ID information, the processor 101 can perform the procedure for changing an enablement STA to an enablement STA (second enablement STA) corresponding to second enablement STA ID information, and can also perform handover to the second AP.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-mentioned embodiments have been disclosed on the basis of the IEEE 802.11 based system for convenience of description, the scope or spirit of the present invention is not limited thereto. That is, the above-mentioned embodiments can also be applied to various mobile communication systems in which an unlicensed device has mobility in a white space band.

The invention claimed is:

1. A method for performing handover by a station (STA) in a white space band wireless communication system, the method comprising:
   allowing a specific STA to access a service region of a second access point (AP), the specific STA being associated with a first access point (AP) and storing a first enablement STA identification information, the first enablement STA identification information being an identification information of an enablement STA managing STA enablement provided by the first AP;
   receiving a message including a second enablement STA identification information, from the second AP, the second enablement STA identification information being an identification information of an enablement STA managing STA enablement provided by the second AP;
   comparing the first enablement STA identification information with the second enablement STA identification information;
   if the first enablement STA identification information is different from the second enablement STA identification information, performing not only a procedure for changing an enablement STA but also a handover to the second AP, to a second enablement STA, the second enablement STA being an enablement STA corresponding to the second enablement STA identification information.

2. The method according to claim 1, further comprising, if the first enablement STA identification information is identical to the second enablement STA identification information, performing a handover to the second AP without performing the enablement STA change procedure.

3. The method according to claim 1, wherein the enablement STA change procedure includes:
   transmitting an enablement request message to the second enablement STA; and
   receiving an enablement response message to the enablement request message from the second enablement STA.

4. The method according to claim 1, wherein:
   the received message is a beacon; and
   source identification information of the beacon is compared with the second enablement STA identification information to determine whether the second AP is the second enablement STA.

5. The method according to claim 4, wherein, if source identification information of the beacon is identical to the second enablement STA identification information, the second AP is the second enablement STA.

6. The method according to claim 4, wherein, if source identification information of the beacon is different from the second enablement STA identification information, the second AP is a dependent AP of the second enablement STA.

7. The method according to claim 1, wherein the first enablement STA identification information and the second enablement STA identification information are MAC addresses of the enablement STA.

8. A station (STA) device for performing handover in a white space band wireless communication system, comprising:
   a memory for storing a first enablement STA identification information, the first enablement STA identification information being an identification information of an enablement STA managing STA enablement provided by a first access point (AP), the first AP being an AP associated with the STA device;
   a transceiver for, if the STA device accesses a service region of a second access point (AP), receiving a message including a second enablement STA identification information from the second AP, the second enablement STA identification information being an identification information of an enablement STA managing STA enablement provided by the second AP; and
   a processor connected to the memory and the transceiver, for comparing the first enablement STA identification information with the second enablement STA identification information when receiving the message, if the first enablement STA identification information is different from the second enablement STA identification information, and performing not only a procedure for changing an enablement STA but also a handover to the second AP, to a second enablement STA, the second enablement STA being an enablement STA corresponding to the second enablement STA identification information.

9. The STA device according to claim 8, wherein, if the first enablement STA identification information is identical to the second enablement STA identification information, the processor performs a handover to the second AP without performing the enablement STA change procedure.

10. The STA device according to claim 8, wherein the transceiver is configured to:
    transmit an enablement request message to the second enablement STA; and
    receive an enablement response message to the enablement request message from the second enablement STA, for the enablement STA change procedure.

11. The STA device according to claim 8, wherein:
    the received message is a beacon; and source identification information of the beacon is compared with the second enablement STA identification information to determine whether the second AP is the second enablement STA.

12. The STA device according to claim 11, wherein, if source identification information of the beacon is identical to the second enablement STA identification information, the second AP is the second enablement STA.

13. The STA device according to claim 11, wherein, if source identification information of the beacon is different from the second enablement STA identification information, the second AP is a dependent AP of the second enablement STA.

14. The STA device according to claim 8, wherein the first enablement STA identification information and the second enablement STA identification information are MAC addresses of the enablement STA.

\* \* \* \* \*